UNITED STATES PATENT OFFICE.

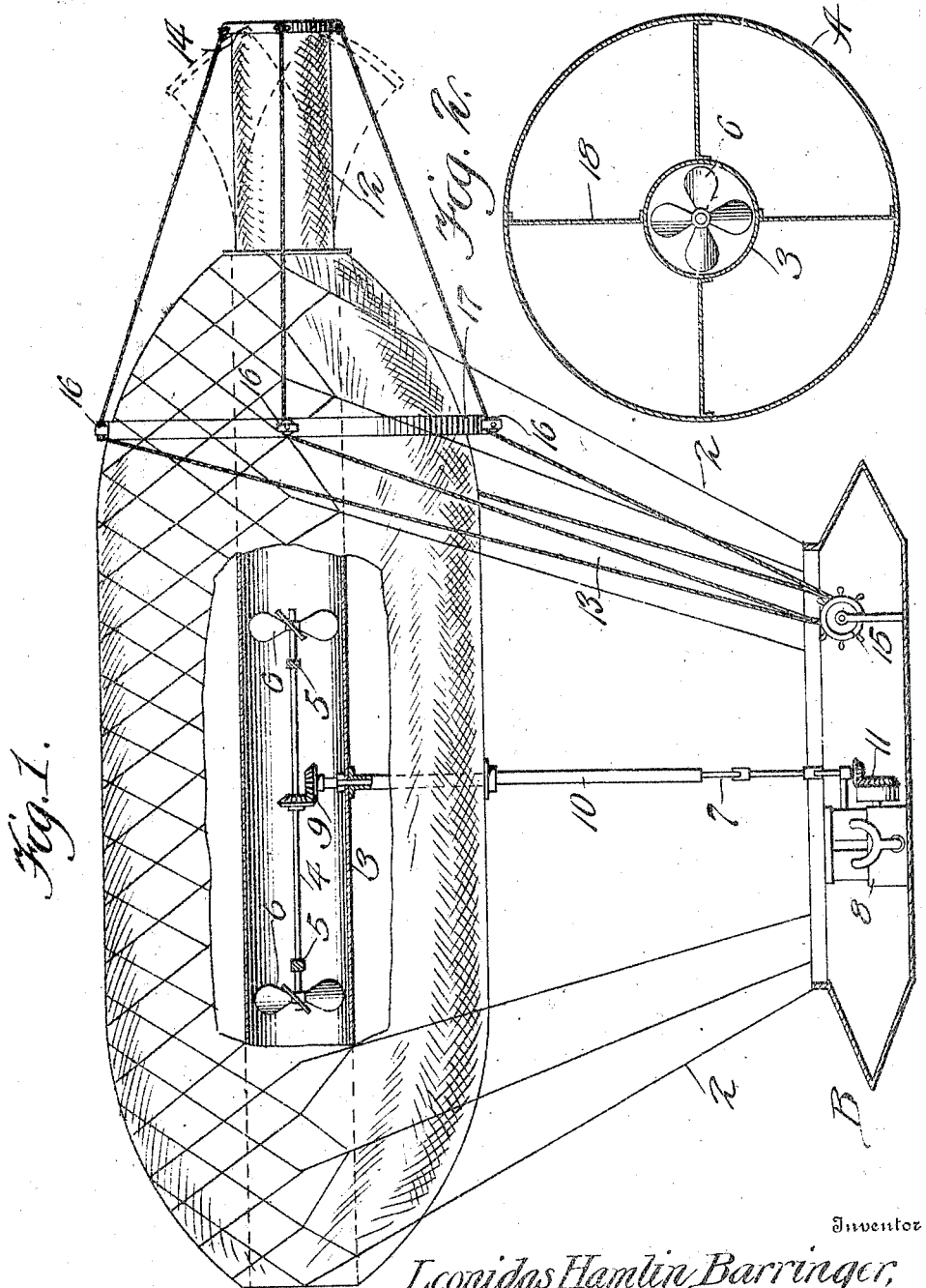

LEONIDAS HAMLIN BARRINGER, OF CHARLESTON, WEST VIRGINIA.

AIRSHIP.

965,682.  Specification of Letters Patent.  Patented July 26, 1910.

Application filed May 29, 1908. Serial No. 435,760.

*To all whom it may concern:*

Be it known that I, LEONIDAS HAMLIN BARRINGER, a citizen of the United States of America, residing at Charleston, in the county of Kanawha and State of West Virginia, have invented new and useful Improvements in Airships, of which the following is a specification.

My invention relates to airships, and its primary object is to provide a device of this character which embodies a novel construction designed to permit the direction of the airship to be varied at will and to cause it to ascend and descend.

A further object of the invention is the provision of an airship which is simple, durable and efficient, and which may be manufactured at a comparatively low cost.

With the above and other objects in view, the invention consists in the construction, combination and arrangement of parts hereinafter fully described, claimed and illustrated in the accompanying drawing, wherein:

Figure 1 is a view in side elevation of an airship constructed in accordance with my invention, the car and a portion of the gas bag and tubular casing being in longitudinal section, and Fig. 2 is a sectional view taken on a plane extending transversely through the gas bag.

Referring to the drawing by reference characters, A designates the gas bag and B the car of my improved airship. The gas bag A may be constructed of canvas, silk or any other material suitable for the purpose, and is preferably elliptical in longitudinal section. The car may be of any construction, and is suspended from the gas bag by means of cables 2.

An open-ended tubular casing 3 is disposed centrally and longitudinally within the gas bag A to provide an air passage extending centrally and longitudinally therethrough. The casing 3 is preferably rigid, and the ends of the gas bag are secured to the ends thereof in any suitable manner. A shaft 4 is journaled within the casing 3 on bracket arms 5 and extends longitudinally thereof. A propeller 6 is secured to each end of the shaft 4, said propellers being designed when rotated to propel the airship in a manner that should be apparent. The shaft 4 is operated to rotate the propeller 6 by means of a driving shaft 7 which receives motion from a motor 8 located in the car B. The shaft 7 is connected to the shaft 4 through the medium of gears 9, and is journaled in a casing 10 which is secured to and depends from the casing 3. The connection between the casing 10 and the casing 3 and the gas bag A is such as to prevent the escape of gas. The motor 8 may be of any appropriate construction, and is connected to the shaft 7 by means of gears 11. A flexible tubular member 12 is secured to and communicates with the casing 3. The member 12 projects rearwardly from the gas bag A to provide a rudder by means of which the direction of the airship can be varied at will. The rudder 12 is constructed of any material suitable for the purpose, and is adapted to be operated to vary the direction of the airship by means of four cables 13. One end of each cable 13 is connected at equally spaced points to an annular metallic reinforcing member 14 which is secured to the end of the rudder 12, the opposite ends of the cables being connected to a suitably constructed steering device 15 located within the car B. The cables 13 pass over pulleys 16 which are journaled on an annular member 17 secured in any suitable manner to the gas bag A. The pulleys 16 are equally spaced on the annular member 17 and alined with the ends of the cables secured to the member 14, so that a pull on one of the cables 13 will cause the rudder to be either bent upwardly or downwardly or laterally. When the rudder is bent upwardly, the balloon is caused to ascend, when downwardly to descend, and when laterally to change its horizontal direction. When the rudder 12 is in normal position, the airship will travel in a horizontal direction.

Longitudinally extending partitions 18 have their edges secured to the casing 3 and to the gas bag A, said partitions dividing the gas bag into a plurality of non-communicating gas compartments. As the gas bag comprises a plurality of non-communicating gas compartments, all of the compartments must be punctured before the gas bag can become completely deflated. The partitions 18 not only divide the gas bag into a plurality of non-communicating gas compartments but also retain the casing 3 in the center of the gas bag when the gas bag is inflated.

From the foregoing description taken in connection with the accompanying drawing, the construction and mode of operation of the invention should be understood without a further extended description.

Changes in the form, proportions and minor details of construction may be made within the scope of the claim without departing from the spirit or sacrificing any of the advantages of the invention.

Having fully described and illustrated my invention, what I claim is:

An airship comprising an elliptical gas bag, an open ended casing disposed within the gas bag to provide an air passage extending centrally and longitudinally therethrough, one end of the casing projecting beyond one end of the gas bag to form a rudder, longitudinally extending partitions secured at their edges to the casing and to the gas bag, said partitions dividing the gas bag into a plurality of non-communicating gas compartments and retaining the casing in the center of the bag, a car suspended from the gas bag, a propeller in the casing, means in the car for driving the propeller, and means in the car for controlling the rudder.

In testimony whereof I affix my signature in presence of two witnesses.

LEONIDAS HAMLIN BARRINGER.

Witnesses:
P. W. RIDER,
W. M. PETERS.